US006415146B1

(12) United States Patent
Capece

(10) Patent No.: US 6,415,146 B1
(45) Date of Patent: Jul. 2, 2002

(54) WIRELESS SYSTEM ENABLING MOBILE-TO-MOBILE COMMUNICATION

(75) Inventor: Christopher J. Capece, Lebanon, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/317,971

(22) Filed: May 25, 1999

(51) Int. Cl.[7] ................................................ H04Q 7/20
(52) U.S. Cl. ........................ 455/426; 455/517; 455/414
(58) Field of Search .................................. 455/426, 524, 455/420, 68, 20, 88, 418, 419, 515, 422, 456, 450, 525, 517; 370/337, 330, 344, 347

(56) References Cited

U.S. PATENT DOCUMENTS

| 4,935,927 A | * | 6/1990 | Kaewell, Jr. et al. ....... 370/506 |
| 5,495,508 A | * | 2/1996 | Kaewell, Jr. et al. ....... 375/356 |
| 5,594,740 A | * | 1/1997 | LaDue ........................ 455/410 |
| 5,621,753 A | * | 4/1997 | Weber ......................... 375/133 |
| 5,625,653 A | * | 4/1997 | Kaewell, Jr. et al. ....... 375/356 |
| 5,748,621 A | * | 5/1998 | Masuda et al. .............. 455/452 |
| 5,771,463 A | * | 6/1998 | Lehmusto et al. ........... 455/509 |
| 5,907,794 A | * | 5/1999 | Lehmusto et al. ......... 455/11.1 |
| 5,995,500 A | * | 11/1999 | Ma et al. ..................... 455/524 |
| 6,289,218 B1 | * | 9/2001 | Liu ............................. 370/503 |

* cited by examiner

Primary Examiner—Dwayne Bost
Assistant Examiner—Sonny Trinh
(74) Attorney, Agent, or Firm—Harness, Dickey & Pierce, P.L.C.

(57) ABSTRACT

A wireless communications system and method, as well as a dual personality mobile, enable direct communication between subscribers of a wireless communications network. During a call between mobiles, which are suitably situated for direct communication, one mobile assumes a base station personality to establish a mobile-to-mobile traffic link. During a base station emulating mode, the mobile receives/transmits traffic signals at frequencies in the base station receive/transmit band. At least one of the mobiles monitors the quality of the mobile-to-mobile traffic link, and reports such quality measurements back to a serving base station. When the quality measurements received by the serving base station indicate that the mobile-to-mobile traffic link has deteriorated below an acceptable threshold, the base station emulating mobile is instructed to hand off traffic transmission to the serving base station and resume normal operation. During mobile-to-mobile communication, the base station emulating mobile continues to receive/transmit control information from/to the serving base station. Therefore, the serving base station maintains control over the call, and preserves billing information.

16 Claims, 4 Drawing Sheets

WIRELESS SYSTEM ENABLING MOBILE-TO-MOBILE COMMUNICATION

BACKGROUND OF THE INVENTION

1. Field of the Invention

The present invention relates to the field of wireless communications.

2. Description of Related Art

In a conventional wireless communications network, such as a cellular or a Personal Communication System (PCS) network, a base station acts as an interface between a subscriber's mobile-telephone ("mobile") and a mobile services switching center (MSC) to exchange control information and traffic between the mobile and the MSC. The MSC in turn serves as an interface between separate network base stations, as well as between the wireless network and a separate network, such as the public switched telephone network (PSTN).

Wireless networks typically provide two types of "channels": traffic channels for carrying voice frequency traffic, and control channels for carrying control information used by a base station and/or a MSC to set up and monitor calls and manage handoffs between base stations as the mobile moves through adjacent cells. Depending on the type of wireless network employed, the plurality of channels which enable a single base station to efficiently serve numerous subscribers in a local geographic area are realized, for example, by dividing a licensed frequency band ("licensed spectrum") into multiple frequency channels (e.g., Frequency Division Multiple Access-FDMA), assigning time slots (e.g., Time Division Multiple Access-TDMA), assigning unique pseudo-random codes (Code Division Multiple Access-CDMA), etc.

A mobile typically monitors the relative quality of control signals, such as paging or pilot signals (in CDMA networks), transmitted by the surrounding base stations to determine which base station should serve the mobile's calls, and to control handoffs as the mobile moves between adjacent cells. When setting up a call, the serving base station instructs the mobile, via a control channel, on which traffic channels to transmit and receive.

When one subscriber calls another subscriber in the conventional wireless network described above, the MSC forwards traffic received from a transmitting mobile via the transmitting mobile's serving base station to the receiving mobile via the receiving mobile's serving base station. Such traffic routing through at least one base station and the MSC occurs even when the mobiles are in close proximity. Therefore, the conventional wireless communications network uses essentially the same resources for serving calls between subscribers, regardless of their proximity.

SUMMARY OF THE INVENTION

The present invention is a wireless communications system and method which enables proximate mobiles to directly communicate, thereby reducing the burden imposed on network resources by calls between subscribers in the same geographic area. The present invention is also a dual-personality mobile which assumes a base station personality to enable mobile-to-mobile communication, thereby transmitting/receiving traffic to/from another mobile at base station transmit/receive frequencies.

In one embodiment, a serving base station for a calling and a called mobile establishes signaling links with the mobiles using designated control channels. When the serving base station recognizes that the calling and called mobiles are served by the same base station or adjacent base stations, the serving base station instructs the calling mobile and/or the called mobile to monitor the other mobile's control information transmissions. The so-instructed mobile reports the quality of the control information transmitted by the other mobile, for example based on signal-to-interference ratio or bit error rate measurements, to the serving base station.

If the reported quality measurements are adequate, rather than assign separate mobile-base station traffic channels, the MSC initiates mobile-to-mobile communication by having the serving base station instruct either the calling or the called mobile to enter a base station emulating mode. In the base station emulating mode, the dual-personality mobile establishes a mobile-to-mobile traffic link by transmitting/receiving traffic at base station transmit/receive frequencies. During mobile-to-mobile communication, the serving base station continues to control the call via the established signaling links, thereby maintaining billing information and the like.

During mobile-to-mobile communication, the calling and called mobiles measure mobile-to-mobile traffic link quality, and report these quality measurements via the serving base station. When the reported quality measurements indicate a deteriorating mobile-to-mobile traffic link, due for example to mobility, the MSC terminates mobile-to-mobile communication by having the serving base station instruct the base station emulating mobile to resume normal operation (i.e., assigning traffic channels over the network infrastructure and a separate pair of air interface channels for the mobile no longer in the base station emulating mode), thereby handing off traffic communication to the serving base station. If the mobiles later return to suitable positioning, the MSC re-initiates mobile-to-mobile communication by having the serving base station again instruct one of the mobiles to assume a base station personality.

Advantageously, this embodiment of the present invention enables the wireless network to handle a significant number of calls between proximate mobiles, without relying on network infrastructure to support the resulting voice traffic. Therefore, this embodiment is particularly suited to environments in which communicating subscribers are likely to be in close proximity, such as college campuses and work facilities. Moreover, this embodiment of the present invention does not require a mobile-base station traffic channel for both the calling mobile and the called mobile, thereby reducing the number of air interface channels which are reserved for a call between proximate subscribers. The reduced number of air interface channels allows more subscribers to be served with a given amount of licensed spectrum. Since a serving base station continues to control mobile-to-mobile calls, billing information is preserved and handled by the MSC.

BRIEF DESCRIPTION OF THE DRAWINGS

Other aspects and advantages of the present invention will become apparent upon reading the following detailed description and upon reference to the drawings, in which.

DETAILED DESCRIPTION

The present invention is a wireless communications system and method which enables direct communication between proximate mobiles. The present invention is also a dual-personality mobile which assumes a base station personality to support mobile-to-mobile communication. Illustrative embodiments of the wireless communications system/method and dual-personality mobile according to the present invention are described below.

Figure 1:
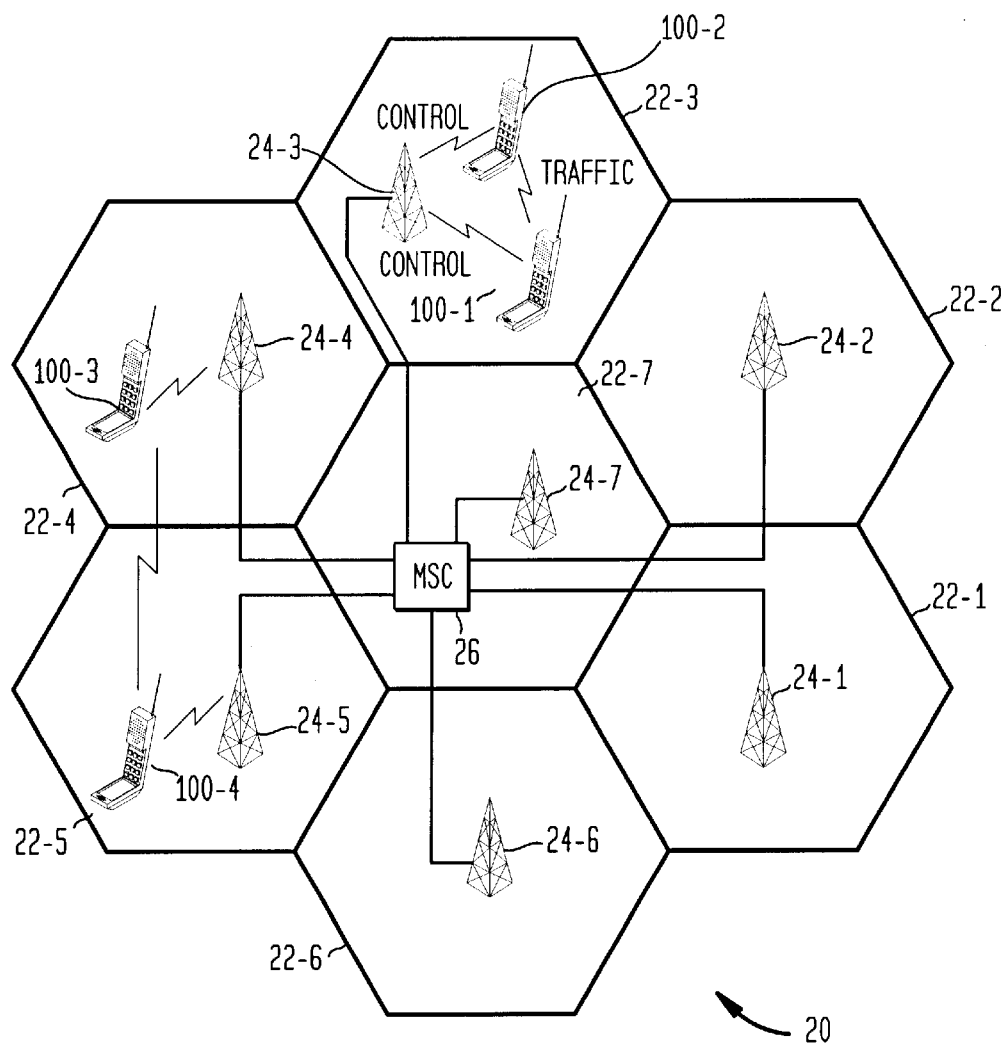
FIG. 1 illustrates a wireless communication network configuration suitable for implementing embodiments of the present invention.

Referring now to FIG. 1, there is shown a wireless communications network suitable for implementing embodiments of the present invention. The wireless network provides communications services to subscribers in a geographical area 20. As shown in FIG. 1, the geographical area 20 is divided into a plurality of cells 22-1, ..., 22-7. Each of the cells 22-1, ..., 22-7 has a corresponding base station 24-1, ..., 24-7 for providing wireless communications coverage to mobiles within the cell. Each of the base stations 24-1, ..., 24-7 is connected to a MSC 26, which manages the wireless network, and serves as an interface between network base stations and also between the wireless network and a separate network, such as a PSTN (not shown).

As will be apparent to those skilled in the art, many variations on the wireless communications network illustrated in FIG. 1 are possible. For example, each of the cells 22-1, ..., 22-7 may be divided into a plurality of sectors. Additionally, although the cells 22-1, ..., 22-7 are shown as hexagonal areas, different area shapes are possible.

As described above, a mobile selects a serving base station by measuring the relative quality of control signals transmitted by the surrounding base stations. Referring again to FIG. 1, a first mobile 100-1 and a second mobile 100-2, both located in cell 22-3, thus determine that base station 24-3 will act as their serving base station. Similarly, a third mobile 100-3 located in cell 22-4 and a fourth mobile 100-4 located in cell 22-5 determine that base stations 24-4 and 24-5 will act as their respective serving base stations.

Figure 2:
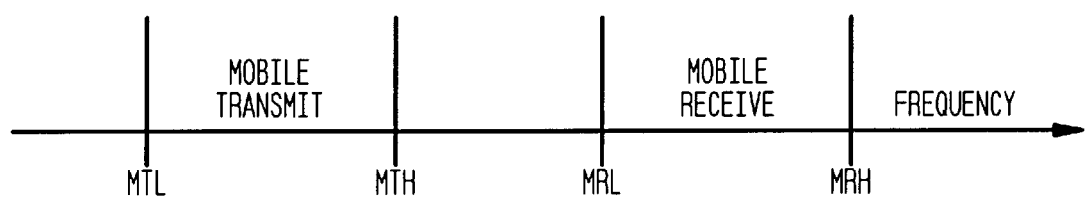
FIG. 2 depicts typical mobile transmit and mobile receive frequency bands.

To allow simultaneous transmission and reception between base stations and mobiles, mobiles typically transmit and receive at frequencies in separate frequencies bands, called the mobile transmit (base station receive) and the mobile receive (base station transmit) bands. FIG. 2 illustrates typical mobile transmit and mobile receive bands, in which the lower and upper boundaries of the mobile transmit band are labeled MTL (mobile transmit low) and MTH (mobile transmit high) respectively, and the lower and upper boundaries of the mobile receive band are labeled MRL (mobile receive low) and MRH (mobile receive high) respectively.

To enable mobile-to-mobile communication according to an embodiment of the present invention, one mobile emulates a base station by receiving traffic signals from another mobile at base station receive frequencies, and transmitting traffic signals to the other mobile at base station transmit frequencies. The base station emulating mobile continues to transmit/receive control information to/from the serving base station at normal mobile transmit/receive frequencies. Therefore, according to an embodiment of the present invention, a dual-personality mobile includes a dual personality receiver and a dual personality transmitter which switch between normal and base station emulating modes, and which also switch between traffic and control frequencies during the base station emulating mode.

Figure 3:
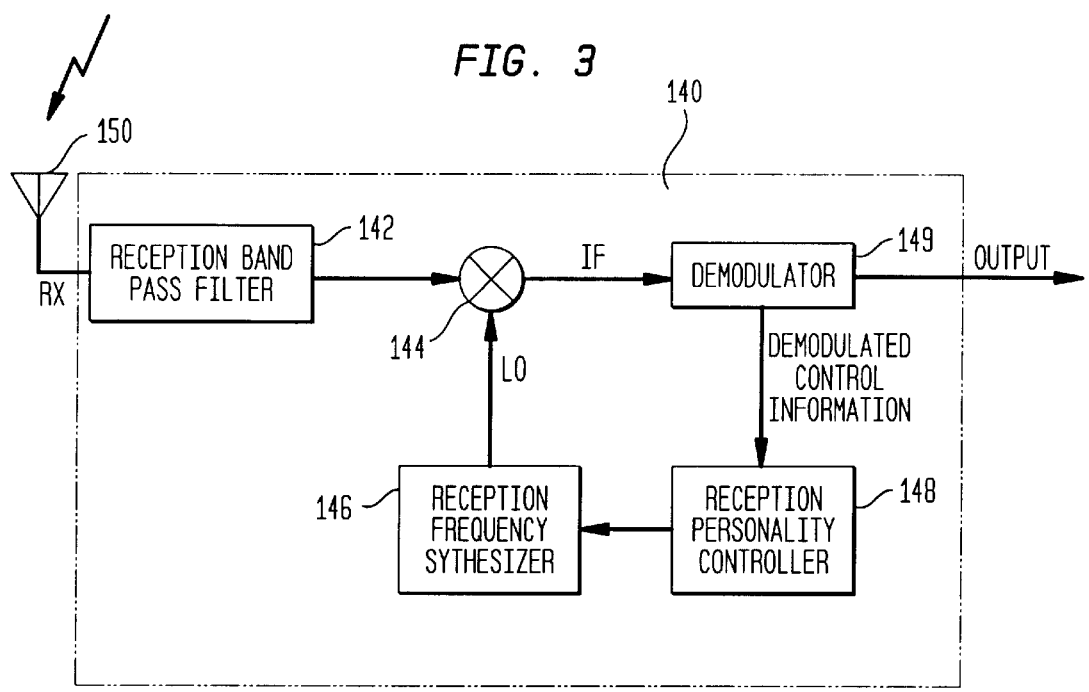
FIG. 3 is a block diagram of certain receiver elements of a dual-personality mobile-telephone according to the present invention.

FIG. 3 is a block diagram depicting select circuit components of a dual-personality mobile receiver 140 in accordance with an embodiment of the present invention. As shown in FIG. 3, the dual-personality mobile receiver 140 includes a reception band-pass filter 142, a mixer 144, a reception frequency synthesizer 146, a reception personality controller 148, and demodulator 149.

The reception band-pass filter 142 is connected to the mobile's antenna 150 to receive RF signals transmitted from surrounding base stations, as well from other sources such as proximate mobiles. The reception band-pass filter 142 filters out frequency components from a received RF signal (Rx) which are outside the mobile transmit and mobile receive frequency bands.

The mixer 144 receives the band-pass filtered Rx signal from the reception band-pass filter 142, and also receives a local oscillating (LO) signal from the reception frequency synthesizer 146. The reception personality controller 148 controls the reception frequency synthesizer 146 to output an LO signal which, when mixed with the band-pass filtered Rx signal, results in an intermediate frequency (IF) signal suitable for subsequent demodulation. The dual-personality mobile receiver 140 receives control signals from base stations at frequencies in the mobile receive band, and receives traffic signals at frequencies in the base station receive band when operating in base station emulating mode. Therefore, the reception frequency synthesizer 146, under control of the reception personality controller 148, outputs an LO signal having a frequency which depends on whether the dual-personality mobile receiver 140 is in the base station emulating mode or normal operating mode, and further depending on whether control or traffic signals are being demodulated during the base station emulating mode.

The demodulator 149 receives the IF signal from the mixer 144, and demodulates the IF signal to recover transmitted information (e.g., a digital bitstream representing audio or control information). The reception personality controller 148 receives recovered control information from the demodulator 149 so that the mobile's operating mode may be controlled in accordance with instructions from the serving base station. The reception personality controller 148 further receives demodulated traffic information so that, as discussed below, the reception personality controller 148 may assess the quality of the mobile-to-mobile traffic link during the base station emulating mode.

Figure 4:
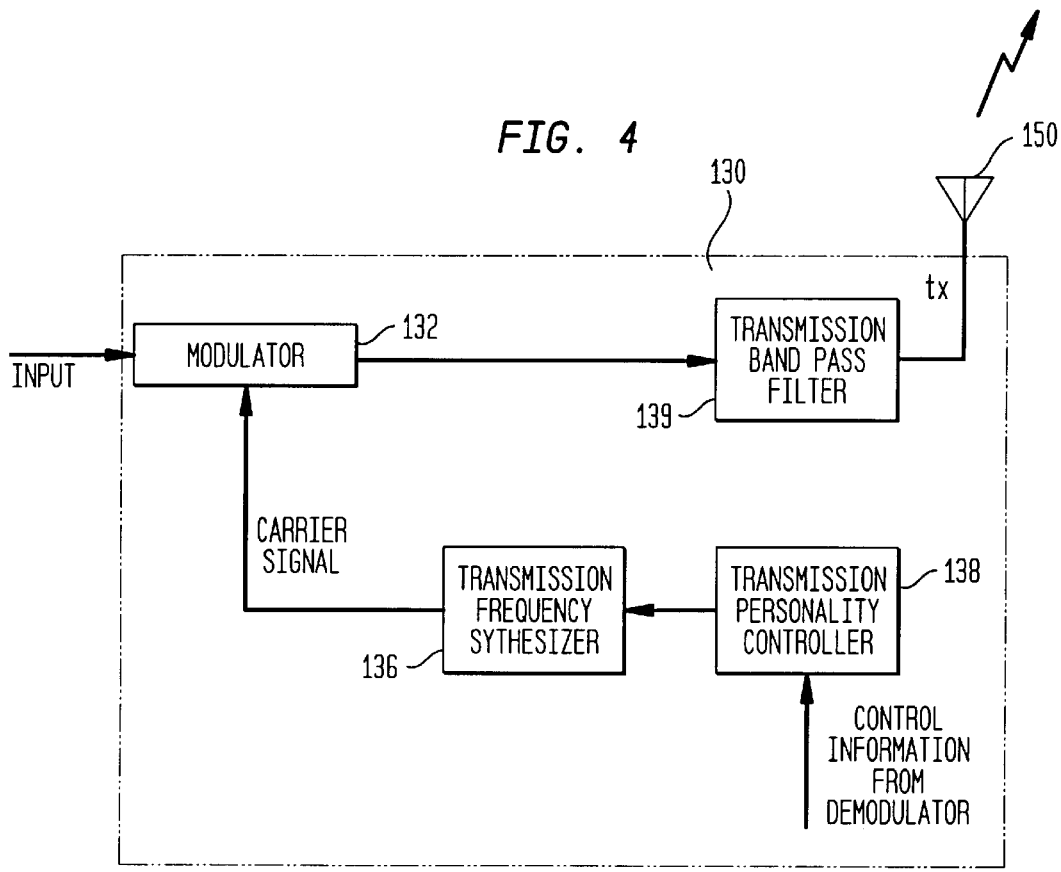
FIG. 4 is a block diagram of certain transmitter elements of a dual-personality mobile-telephone according to the present invention.

FIG. 4 is a block diagram depicting select circuit components of a dual-personality mobile transmitter 130 in accordance with an embodiment of the present invention. As shown in FIG. 4, the dual-personality mobile transmitter 130 includes a modulator 132, a transmission frequency synthesizer 136, a transmission personality controller 138, and a transmission band pass filter 139. It should be recognized that a single controller, such as a programmed microprocessor, may function as both the reception personality controller 148 and the transmission personality controller 138.

The modulator 132 modulates an RF carrier signal received from the transmission frequency synthesizer 136 with traffic information, such as a digitally processed audio or control information bitstream, using, for example, known modulation techniques.

The transmission personality controller 138 controls the transmission frequency synthesizer 136 to output a carrier signal having a frequency which is suitable for transmission. The dual-personality mobile transmitter 130 transmits control information to the serving base station using mobile transmit frequencies, and transmits traffic signals to another mobile using base station transmit frequencies when operating in base station emulating mode. Therefore, the transmission frequency synthesizer 136, under control of the transmission personality controller 138, outputs a carrier signal having a frequency, which depends on whether the dual-personality mobile transmitter 130 is in the base station emulating mode and on whether control or traffic signals are being transmitted during the base station emulating mode. The transmission personality controller 138 receives demodulated control information from the demodulator 149.

The transmission band-pass filter 139 filters out frequency components from the RF modulated signal which are outside the mobile transmit and mobile receive frequency bands, and is connected to the mobile's antenna 150 to transmit RF signals (Tx).

Operation

In order to achieve mobile-to-mobile communication, the wireless communications system according to an embodiment of the present invention initially determines whether the calling and called mobiles are suitably situated for direct communication. If so, the MSC 26 instructs one of the mobiles, via the serving base station, to assume a base station personality, thereby establishing a mobile-to-mobile traffic link. The serving base station periodically monitors the mobile-to-mobile traffic link, using quality measurements transmitted from one or both of the mobiles to the serving base station, to detect deteriorating mobile-to-mobile traffic link quality. When the mobile-to-mobile traffic link quality deteriorates below a quality threshold, the serving base station instructs the base station emulating mobile to resume normal operation, and hands off traffic transmission to the serving base station.

Figure 5:
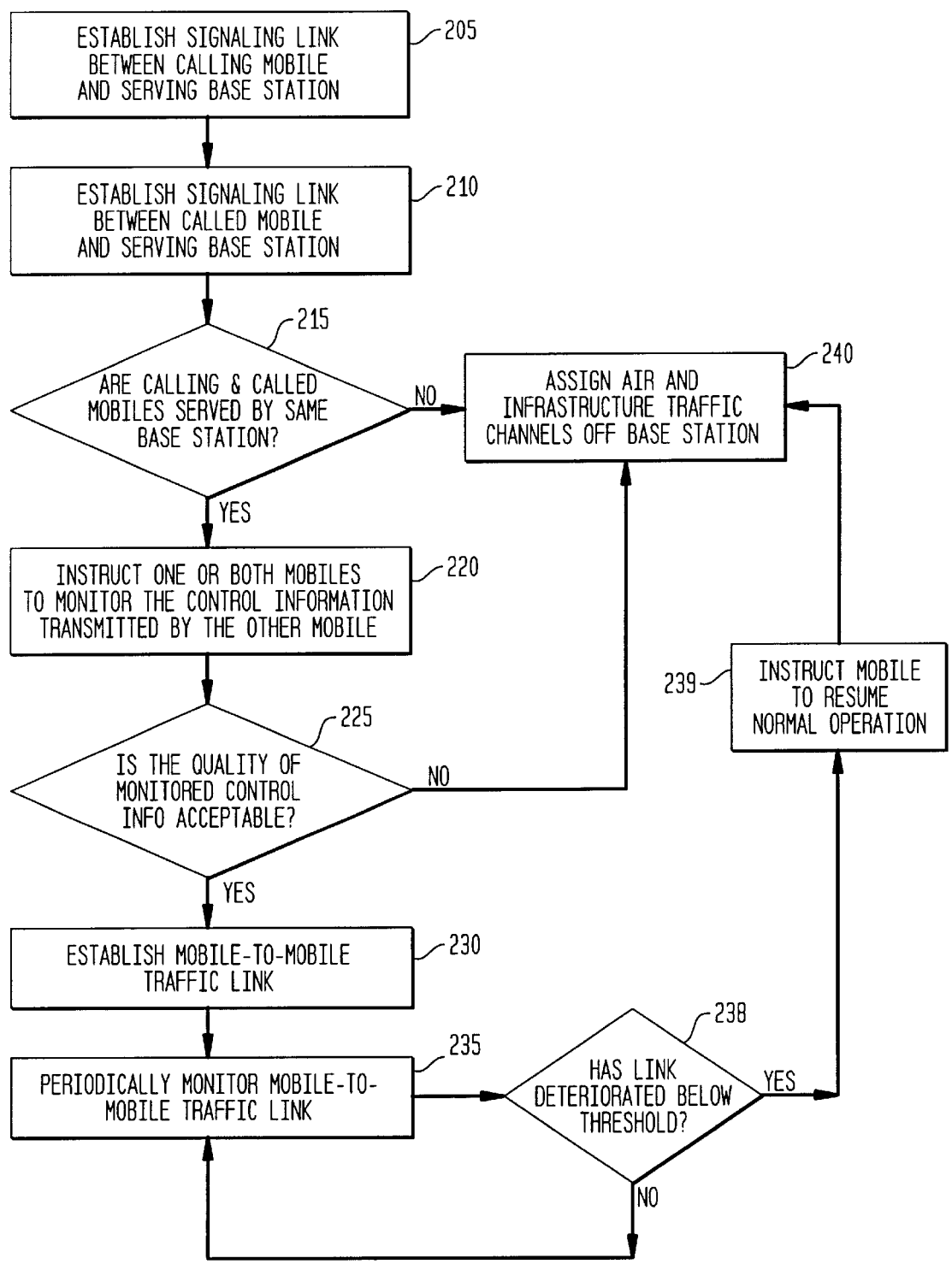
FIG. 5 is a flow-chart illustrating the steps for initiating and controlling mobile-to-mobile communication in accordance with an embodiment of the present invention.

Referring to FIG. 5, a flowchart 200 illustrates the steps for achieving direct mobile-to-mobile communication in accordance with an embodiment of the present invention. The steps of flowchart 200 will be described using an example in which the first mobile 100-1 calls the second mobile 100-2.

In step 205, the first mobile 100-1 establishes a signaling link with the base station 24-3 via an assigned or dedicated control channel (e.g., an access channel). In step 210, the base station 24-3 pages the second mobile 100-2, and the second mobile 100-3 establishes a signaling link with the base station 24-3 via a control channel.

In step 215, the serving base station determines whether the calling mobile 100-1 and the called mobile 100-2 are served by the same base station. If the serving base station determines at step 215 that the calling and the called mobiles are not served by the same base station, indirect communication (i.e., via the serving base stations and the MSC) is carried out in step 240 in the conventional manner. In the example shown in FIG. 1, the base station 24-3 serves both the first mobile 100-1 and the second mobile 100-2, and therefore the flowchart proceeds to step 220, in which the base station 24-3 instructs the first mobile 100-1 and/or the second mobile 100-2 to monitor control information transmitted by the other mobile. The quality of the monitored control information, based for example on signal-to-interference ratio or bit error rate, indicates whether the mobiles are suitable for direct communication.

In step 225, the MSC 26 determines whether to initiate mobile-to-mobile traffic communication based on the reported control information quality measurements made by the first mobile 100-1 and/or the second mobile 100-2. If the MSC 26 determines, based on quality measurements reported by the mobile 100-1 and/or 100-2, that the mobile-to-mobile link quality meets an acceptability threshold, the MSC 26 instructs either the first mobile 100-1 or the second mobile 100-2 to enter a base station emulating mode in step 230 so that a mobile-to-mobile traffic link is established. Being able to command either mobile to enter base station emulating mode allows direct mobile-to-mobile communication with mobiles (calling or called) that do not support base station emulating mode. Alternatively, if the MSC 26 determines at step 225 that the reported quality measurements are not acceptable, traffic channels are assigned off the serving base station at step 240 in the conventional manner.

During mobile-to-mobile communication, both the first mobile 100-1 and the second mobile 100-2 maintain signaling links with the base station 24-3. Furthermore, the first mobile 100-1 and/or the second mobile 100-2 periodically make qualitative assessments of the mobile-to-mobile traffic link quality at step 235. Therefore, if the MSC 26 determines in step 238 that the mobile-to-mobile traffic link quality has dropped below an acceptability threshold, for example due to mobility, the serving base station 24-3 instructs the base station emulating mobile to return to the normal operating mode in step 239, and traffic channels (air and infrastructure) are assigned off the serving base station at step 240 in the conventional manner.

When the base station emulating mobile eventually hands back to the serving base station, subsequent attempts may be made to re-establish mobile-to-mobile communication in accordance with steps 215, 220, 225, and 230.

Although the serving base station initially decides in flowchart 200 whether to attempt mobile-to-mobile communication by determining whether the calling and the called mobiles are served by the same base station, this embodiment may be modified so that mobile-to-mobile communication is attempted for mobiles served by either the same base station or adjacent base stations.

As described above with reference to FIG. 2, mobiles normally transmit at frequencies in the mobile transmit band, and receive at frequencies in the mobile receive band. For mobile-to-mobile communication according to an embodiment of the present invention, the dual-personality mobile transmits and receives using the mobile transmit and receive bands during normal operation, and while transmitting control information during the base station emulating mode. Furthermore, the dual personality mobile emulates a base station by transmitting and receiving traffic using the base station transmit and receive bands. As described above, the reception personality controller 148 controls the reception frequency synthesizer 146, and the transmission personality controller 138 controls the transmission frequency synthesizer 136, to achieve this dual-personality function.

Figure 6A:
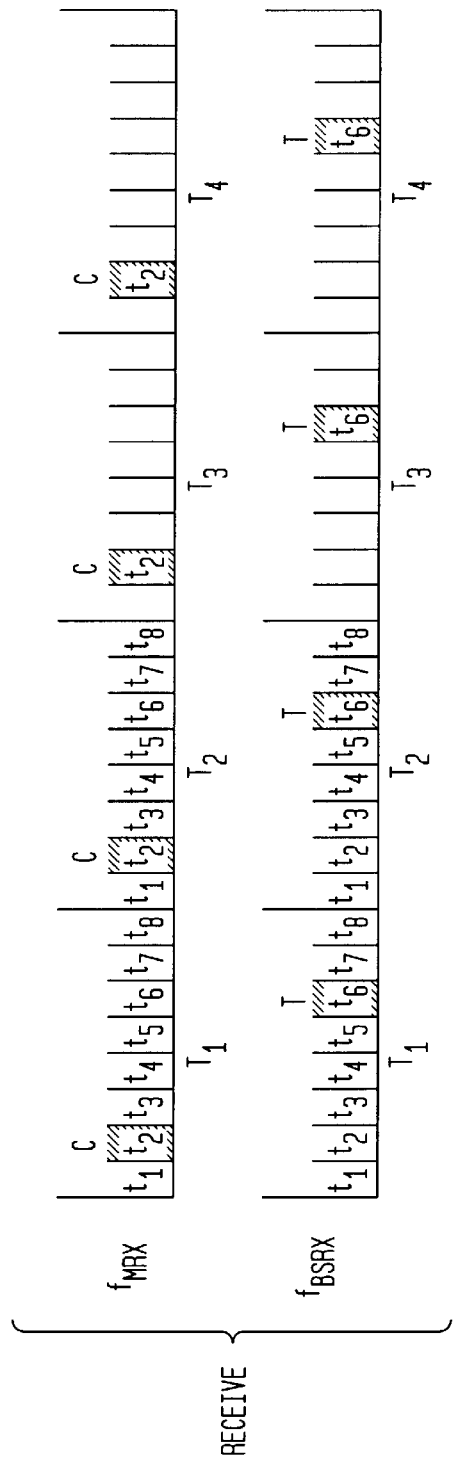
FIGS. 6A–6B depict a time division multiplexing scheme which allows a dual-personality mobile to transmit/receive control information using the normal mobile transmit/receive frequency band, and transmit/receive traffic to/from a proximate mobile using the base station transmit/receive frequency band.
Figure 6B:
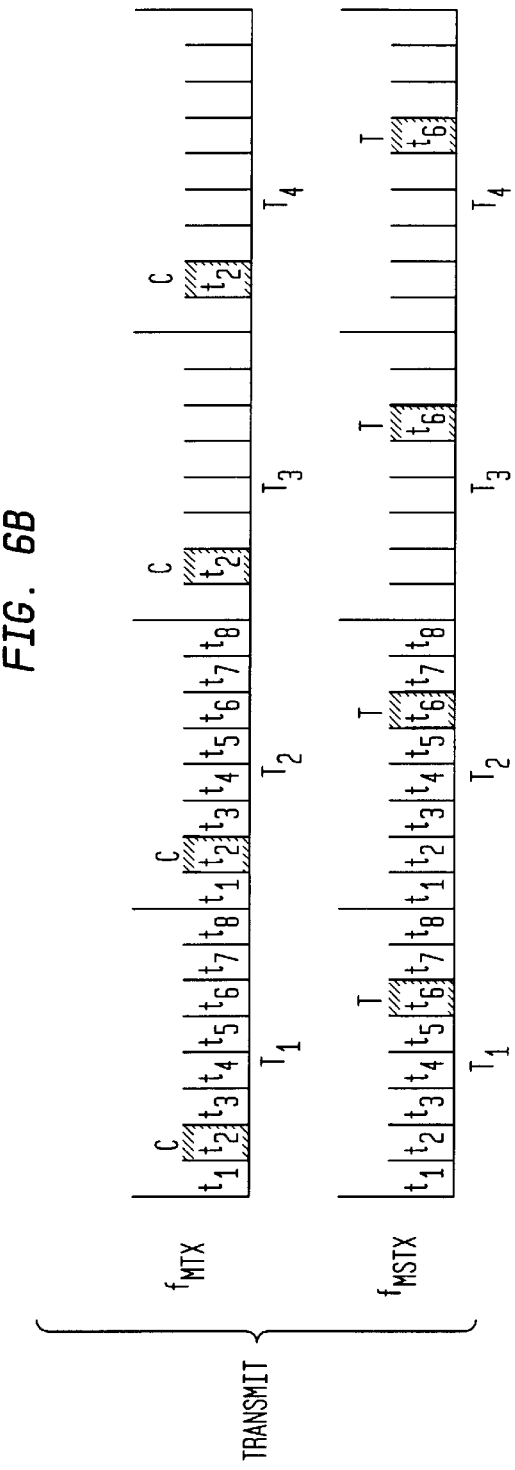

FIG. 6A illustrates an example, according to an embodiment of the present invention, of how the dual-personality receiver 140 emulates a base station for mobile-to-mobile communication, while maintaining signaling links with the serving base station. Similarly, FIG. 6B illustrates an example of how the dual-personality transmitter 130 emulates a base station for mobile-to-mobile communication, while maintaining signaling links with the serving base station. This example is applicable to certain types of wireless networks which incorporate time division multiplexing.

In FIGS. 6A–6B, each of a plurality of time frames T1–T4 is divided into eight time slots t1–t8. Time slot t2 is a dedicated control channel, and time slot t6 is assigned as a mobile-to-mobile traffic channel. Since the amount of control information is small relative to voice traffic during a call, a single time slot t2 is used for transmitting control information between the serving base station and both the calling and the called mobiles using conventional time-sharing techniques. The separate dedicated control is shown for illustrative purpose. Because the amount of control information is small, another approach would be for the control channel to be associated with the traffic channel, in which case traffic and control could share the time slot. Additionally, a common control channel be employed for all mobiles.

Referring to FIG. 6A, during a base station emulating mode, the dual-personality receiver 140 receives control information from the serving base station at a mobile receive frequency, $f_{MRX}$, in time slot t2, and receives traffic from a second mobile using a base station receive frequency, $f_{BSRX}$, in time slot t6 of frame T1. Therefore, the reception frequency synthesizer 146 switches between LO signal frequencies for mobile receive and base station receive frequencies $f_{MRX}$ and $f_{BSRX}$ in time slots t2 and t6 of the successive time frames T1–T4 under control of the reception personality controller 148. This "hopping" between mobile and base station receive frequencies $f_{MRX}$ and $f_{BSRX}$ continues as long as the dual-personality mobile is in base station emulating mode.

Referring to FIG. 6B, during a base station emulating mode, the dual-personality transmitter 130 transmits control information to the servicing base station using a mobile transmit frequency, $f_{MTX}$, in time slot time t2, and transmits traffic to the calling mobile using a base station transmit frequency, $f_{BSTX}$, in time slot t6 of frame T1. Therefore, the transmission frequency synthesizer 136 switches between mobile transmit and base station transmit carrier signal frequencies $f_{MTX}$ and $f_{BSTX}$ in time slots t2 and t6 of successive time frames T2–T4. This "hopping" between mobile and base station transmit frequencies $f_{MTX}$ and $f_{BSTX}$ continues as long as the dual-personality mobile is in base station emulating mode.

The above example underscores an advantage achieved by the mobile-to-mobile communication according to the present invention. Specifically, in a conventional mobile call, there are two separate transmit and receive channels required for traffic communications: one pair for transmitting between the calling mobile and the base station, and a second pair for transmitting between the called mobile and the base station. With mobile-to-mobile communication, since the mobile assumes the personality of the base station, only one air interface traffic channel pair is required.

It should be apparent to those skilled in the art that, although an embodiment of the present invention is described above using time division multiplexing, principles of the present invention can naturally be extended to a code division system since the fundamental concepts of separate control and traffic channels apply in such networks as well. For a code division system, however, codes are used instead of time slots to designate control and traffic channels.

Various other modifications of this invention are contemplated which may be realized by those skilled in the art without departing from the spirit and scope of the present invention.

For example, in the embodiment described above, the serving base station performs certain functions such as recognizing when mobiles are served by the same base station. Such functions may instead be performed by the MSC. In other words, the mobile-to-mobile communication may be essentially transparent to the MSC, or the MSC may assume a significant role.

Furthermore, although the example set forth above illustrated mobile-to-mobile communication between the first mobile 100-1 and the second mobile 100-2 shown in FIG. 1, which are served by the same base station 24-3, mobile-to-mobile communication may also occur between mobiles served by different base stations, such as the third mobile 100-3 and the fourth mobile 100-4 illustrated in FIG. 1, which are served by base stations 24-4 and 24-5, respectively, as long as the mobiles are in close enough proximity to achieve acceptable quality as previously described.

What is claimed is:

1. A communication method comprising:

determining whether a first mobile phone and a second mobile phone of a wireless communications network, which each communicate with a base station during normal operation by transmitting at a frequency in a first frequency band and receiving at a frequency in a second frequency band that is separate from said first frequency band, are suitably situated for direct communication, the first mobile phone and the second mobile phone being suitably situated for direct communication when located in adjacent cells and in close enough proximity to achieve acceptable communication quality; and instructing the first mobile phone to assume a base station personality when said determining step indicates that the first mobile phone and the second mobile phone are suitably situated for direct communication.

2. The method of claim 1, wherein said determining step includes:

instructing one or both of the first mobile phone and the second mobile phone to monitor control information transmitted by the other mobile phone; and judging whether the quality of the monitored control information indicates that an acceptable mobile-to-mobile traffic link between the first mobile and the second mobile can be established.

3. The method of claim 1, further comprising:

monitoring the quality of a mobile-to-mobile traffic link after the first mobile phone has assumed the base station personality; and instructing the first mobile to assume a normal mobile phone personality when said monitoring step indicates that the quality of the mobile-to-mobile traffic link has deteriorated below a threshold.

4. The method of claim 1, wherein:

the first mobile phone transmits/receives traffic signals at a base station transmit/receive frequency after assuming the base station personality; and the first mobile phone transmits/receives controls signals at a mobile transmit/receive frequency after assuming the base station personality.

5. A communication system comprising:

determining means for determining whether a first mobile phone and a second mobile phone of a wireless communications network, which each communicate with a base station during normal operation by transmitting at a frequency in a first frequency band and receiving at a frequency in a second frequency band that is separate from said first frequency band, are suitably situated for direct communication, the first mobile phone and the second mobile phone being suitably situated for direct communication when located in adjacent cells and in close enough proximity to achieve acceptable communication quality; and instructing means for instructing the first mobile phone to assume a base station personality when said determining means indicates that the first mobile phone and the second mobile phone are suitably situated for direct communication.

6. The system of claim 5, wherein said determining means includes:

means for instructing one or both of the first mobile phone and the second mobile phone to monitor control information transmitted by the other mobile phone; and means for judging whether the quality of the monitored control information indicates that an acceptable mobile-to-mobile traffic link between the first mobile and the second mobile can be established.

7. The system of claim 5, further comprising:

monitoring means for monitoring the quality of a mobile-to-mobile traffic link after the first mobile phone has assumed the base station personality; and means for instructing the first mobile to assume a normal mobile phone personality when said monitoring means indicates that the quality of the mobile-to-mobile traffic link has deteriorated below a threshold.

8. The system of claim 5, wherein:

the first mobile phone transmits/receives traffic signals at a base station transmit/receive frequency after assuming the base station personality; and the first mobile phone transmits/receives controls signals at a mobile transmit/receive frequency after assuming the base station personality.

9. A mobile phone of a wireless communications network:

a dual-personality receiver. for receiving at a frequency in a first frequency band during a normal operating mode, and for receiving at a frequency in a second frequency band, which is different than said first frequency band, during a base station emulating mode; and a dual-personality transmitter for transmitting at a frequency in the second frequency band during the normal operating mode, and for transmitting at a frequency in the first frequency band during the base station emulating mode, said mobile phone operating in said base station emulating mode to directly communicate with another mobile phone that is located in an adjacent cell of said wireless communications network and is in close enough proximity to achieve acceptable communication quality.

10. The mobile phone of claim 9, wherein said dual personality receiver receives traffic signals from a second mobile phone at a frequency in the second frequency band during the base station emulating mode, and receives control signals from a base station at a frequency in the first frequency band during the base station emulating mode; and said dual personality transmitter transmits traffic signals at a frequency in the first frequency band during the base station emulating mode, and transmits control signals to a base station at a frequency in the second frequency band during the base station emulating mode.

11. The mobile phone of claim 9, wherein said dual personality transmitter includes:

a transmit personality controller for controlling a generated carrier signal frequency based on whether said mobile phone is in the base station emulating mode or the normal operating mode.

12. The mobile phone of claim 9, wherein said dual personality receiver includes:

a receive personality controller for controlling a generated local oscillating signal frequency based on whether said mobile phone is in the base station emulating mode or the normal operating mode.

13. The mobile phone of claim 9, wherein said mobile phone initiates and terminates the base station emulating mode in accordance with control information received from a serving base station.

14. The mobile phone of claim 13, wherein said mobile phone makes mobile-to-mobile traffic link quality measurements during the base station emulating mode, and reports the link quality measurements to the serving base station.

15. The mobile phone of claim 14, wherein said mobile phone hands off traffic transmission to the serving base station when instructed by the serving base station.

16. The mobile phone of claim 15, wherein the serving base station instructs said mobile to hand traffic transmission to the serving base station when the reported traffic link quality measurements drop below a threshold.

* * * * *